United States Patent [19]

Miller et al.

[11] 4,351,982
[45] Sep. 28, 1982

[54] RSA PUBLIC-KEY DATA ENCRYPTION SYSTEM HAVING LARGE RANDOM PRIME NUMBER GENERATING MICROPROCESSOR OR THE LIKE

[75] Inventors: William J. Miller, North Miami; Nick G. Trbovich, Hollywood, both of Fla.

[73] Assignee: Racal-Milgo, Inc., Miami, Fla.

[21] Appl. No.: 216,435

[22] Filed: Dec. 15, 1980

[51] Int. Cl.³ .............................................. H04L 9/00
[52] U.S. Cl. .................................................. 178/22.11
[58] Field of Search ........................... 178/22.10, 22.11

[56] References Cited

U.S. PATENT DOCUMENTS 4,218,582  8/1980  Hellman et al. .................. 178/22.11

OTHER PUBLICATIONS

"A Modification of the RSA Public Key Encryption Procedure", Williams, *IEEE Transaction on Information Theory*, vol. IT-26, No. 6, Nov. 1980, pp. 726–729.

*Primary Examiner*—Howard A. Birmiel
*Attorney, Agent, or Firm*—Jackson, Jones & Price

[57] ABSTRACT

A public-key data encryption system employing RSA public-key data encryption including a message encrypter capable of encrypting messages using a non-secret encryption key, a transmitter-receiver coupled to the message encrypter which transmits or receives an encrypted message to or from a remote location, the transmitter-receiver also being coupled to a decrypter capable of decrypting a received encrypted message using a decryption key which is a secret input to the decrypter, and an encryption-decryption key generator, including a microprocessor or other large-scale integrated circuit or circuits formed to generate a sequence of prime numbers beginning with a selected known prime number having a length relatively short with respect to the desired length of the last in the sequence of prime numbers, and which is constructed to form the sequence of prime numbers in the form $hP+1$ where P is the preceding prime number in the sequence, and to test $hP+1$ for primality by first determining if $hP+1$ has a GCD of 1 with x, wherein x is a composite number consisting of the product of all known prime numbers less than or equal to a pre-selected known prime number and if the GCD is not equal to 1, incrementing h to form a new $hP+1$ to be tested for a GCD equal to 1, and when a GCD is found to be 1, performing the primality tests to determine whether $2^{hP} \equiv 1 \ [\text{mod} \ (hP+1)]$ and $2^h \not\equiv 1 \ [\text{mod} \ (hP+1)]$, and if either $2^{hP} \not\equiv 1 \ [\text{mod} \ (hP+1)]$ or $2^h \equiv 1 \ [\text{mod} \ (hP+1)]$ further incrementing h and so on until a prime is found in this manner and then determining if the length of the prime number is of or greater than the desired length. If the $hP+1$ which has been determined to be prime is not of the desired length, $hP+1$ is placed in the sequence of prime numbers and a new h selected to be used to find the next prime number in the sequence in accordance with the above described procedure by forming a new $hP+1$ in which P is the previously determined prime number in the sequence of prime numbers. When a prime number in the sequence of prime numbers is found which is of the desired length it is input into the encryption-decryption key generator for generating the RSA public-key encryption and decryption keys.

22 Claims, 2 Drawing Figures

RSA PUBLIC-KEY DATA ENCRYPTION SYSTEM HAVING LARGE RANDOM PRIME NUMBER GENERATING MICROPROCESSOR OR THE LIKE

FIELD OF THE INVENTION

The present invention relates to RSA public-key data encryption systems.

BACKGROUND AND SUMMARY OF THE INVENTION

The present invention relates to public-key encryption systems, which employ the RSA so-called "trap-door, one-way permutation" data encryption. More particularly, the present invention relates to the method and apparatus employing a currently commercially available microprocessor for generating the large random prime numbers satisfying the requirements for the so-called "trap-door, one-way permutation," incorporated into an RSA public-key data encryption system.

Public-key data encryption, as originally suggested by Diffie and Hellman, "New Directions In Cryptography," I.E.E.E. Transactions on Information Theory (November 1976) (the disclosure of which is hereby incorporated by reference), and perfected by Rivest, Shamir, and Adelman, "A Method for Obtaining Digital Signatures in Public-Key Crypto Systems," MIT Technical Memo LCS/TM82 (August 1977) (the disclosure of which is hereby incorporated by reference), is by now well-known. The basic reason for public-key encryption system is to ensure both the security of the information transferred along a data line, and to guarantee the identity of the transmitter and ensure the inability of a receiver to "forge" a transmission as being one from a subscriber on the data line. Both of these desired results can be accomplished with public-key data encryption without the need for the maintenance of a list of secret keys specific to each subscriber on the data line and/or the periodic physical delivery or otherwise secure transmission of secret keys to the various subscribers on the data line. Through the use of the so-called "open trap-door, one-way permutations" data can be sent from a transmitter to a receiver in an encrypted form using a publicly-known publicly transmitted encryption key, but at the same time not allowing an eavesdropper on the line to be able to decrypt the message within a period of time so large as to guarantee the security of the encrypted message.

This method of public-key encryption developed by Rivest, Shamir & Adelman, and now generally referred to as RSA, is based upon the use of two extremely large prime numbers which fulfill the criteria for the "trap-door, one-way permutation." Such a permutation function enables the sender to encrypt the message using a non-secret encryption key, but does not permit an eavesdropper to decrypt the message by crypto-analytic techniques within an acceptably long period of time. This is due to the fact that for a composite number composed of the product of two very large prime numbers, the computational time necessary to factor this composite number is unacceptably long. Another method of public-key encryption has been suggested for the transmittal of NBS standard keys in "Electronics" magazine of June 5, 1980 at 96–97. This does not use the RSA scheme, but rather employs a public key encryption scheme similar to earlier proposals by, e.g., Hellman, prior to RSA, and has certain security problems not associated with the RSA scheme.

Generally, the RSA system has the following features. Assuming that the receiver of the message is located at terminal A, terminal A will have first computed two very large random prime numbers p, q. The product of p and q is then computed and constitutes the value n. A large random integer e is then selected which has the property that the greatest common divisor of e and the product of (p−1) and (q−1) is 1, i.e., $$GCD[e, (p-1)(q-1)] = 1$$

In other words, e is a large random integer which is relatively prime to the product of (p−1) and (q−1). An integer d is then computed which is the "multiplicative inverse" of e in modulo (p−1) (q−1). That is to say:

$$e * d \equiv 1 [\bmod (p-1)(q-1)].$$

Terminal A transmits n and e to another terminal, Terminal B, in plain text without encryption, or a public list of n and e for every terminal, including Terminal A, is made publicly known. Terminal B responds to encrypting and transmitting a message M into an encrypted transmission C as follows:

$$C = E(M) \equiv M^e (\bmod\ n).$$

It will be understood that each character transmitted along the data network is encoded as a number prior to any encryption, and upon decryption the identical number will result which corresponds to the identical character.

It will be further understood that the message M to be encrypted may be a single binary number of, e.g., 25 bytes in length, i.e., 336 bits, with each group of, e.g., 3 or 4 bits representing the encoding of a specific character within the message M. When the encrypted message C is received and decrypted using the RSA scheme, the identical 25 byte binary number is reproduced, from which the encoded data characters of the message M can be decoded as is well in the art.

Terminal B then sends the encrypted message C. Terminal A then performs an operation upon the received encoded message C as follows:

$$(C)^d (\bmod\ n)$$

Due to the particular nature of the selected large random prime numbers this "open trap-door, one-way permutation" results in the identical message M.

However, an eavesdropper on the line who receives or otherwise knows the publicly transmitted n and e cannot decode the message sent by terminal B without the number d. Thus, the transmission from Terminal B to Terminal A, after receipt of or knowledge of at Terminal B of n and e computed at or for Terminal A, is totally secure. In addition, because the sender of the message and the intended receiver of the message each have a unique n and e, the sender and receiver can each guarantee the authentication of the other by an encrypted "signature", encrypted using their separate n's and e's and decrypted using their separate d's. In this way, both sender and receiver can guarantee the authentication of the origin and receipt of the particular message. This is extremely important in applications such as encrypted electronic mail used for business transactions where proof of transmission and receipt are vital.

In the past, however, the use of such an RSA public-key encryption system has been limited to transmitting and receiving terminals which have access to large scale digital data computers. This is due to the fact that the generation of the required large random prime numbers has only been practical on large scale digital computers. This is because the random numbers p and q must be extremely large. For example, as explained in Rivest, Shamir & Adelman in the above-noted technical memo, there exists a factoring algorithm, the Schroeppel algorithm, for factoring a number n. For a n of e.g., 50 digits in length, the Schroeppel algorithm can be used to factor n in 3.9 hours, on a large scale digital computer. Factoring n is the easiest technique for use by a cryptoanalyst to break the RSA encryption code. If the length of n is increased to 100 digits, the computational time necessary for complete factoring with the Schroeppel algorithm increases to 73 years. Approximately a 1,000 year period is generally accepted as being a totally secure computational decryption time for an encrypted message. This requires a n of approximately 120 digits in length. Since n is derived from the product of two large prime numbers p and q, the product of p and q will have a number of digits equal to the sum of the digits in p and q. Therefore, p and q must be large random prime numbers each having approximately 60 digits in order for about a 1,000 year cryptoanalysis time using, e.g., the Schroeppel algorithm. A good rule of thumb is that for each 2.5 digits in a decimal number there will be one byte of eight binary bits, thus sixty digits would translate to 24 bytes.

The method of finding large random primes outlined in the RSA scheme requires the evaluation of $a^{P-1}$ (mod P) for 100 random $a<P$. If for any a, $a^{P-1}$ (mod P) is not 1, then another P must be chosen and another iteration of 100 modulo exponentiations begun. For the processing of a digital binary representation of decimal numbers on a commercially available microprocessor, each exponentiation requires a multi-precision multiply and divide for each bit in the exponent and an additional multiply and divide for each 1 bit. Thus, for each p and q, which must be on the order of about 184 bits (23 bytes) in order for the product $p \times q$ to be of the required approximately 50 bytes in length, each exponentiation takes an average of 92 seconds on a microprocessor, for example, an Intel 8085 microprocessor.

In testing the RSA scheme, it has been found that most of the time, whenever $3^{P-1}$ (mod P) is 1, then $a^{P-1}$ (mod P) is also 1 for each choice of $0<a<P$. Therefore, the first value of a was always chosen to be 3, and the remaining 99 were chosen as random. Approximately 120 value P have to be tested before one is found which works. The time to find such a P using commercially available microprocessors averages approximately 3 hours. Since 4 separate primes are required for RSA implementation, 12 hours are needed to find the 4 prime numbers with a probability of $\frac{1}{2}$. For the recommended probability of $2^{-100}$, the time necessary increases to 1200 hours.

Public-key encryption has tremendous utility in both unique signatures for message authentication and for transmitting on open channels the periodic changes in encryption keys, e.g., the NBS standard keys. In the latter application, the need for a master key in which to encrypt the periodic changes of the standard key is avoided. Thus, the need to transmit over a secure channel or to physically transport the master key by courier or the like is avoided. Without public-key encryption, each subscriber must have the master key. Though the master key does not change often, as each new subscriber comes on the data encryption line, a master key must be sent in some secure manner to that subscriber. Each such transfer, even over a secure channel or by physical hand delivery, could be compromised, thus necessitating changing the master key for all subscribers, when and if compromise is discovered, and putting the master key in the hands of each subscriber in a secure manner. Public-key encryption enables the standard keys, which change periodically, to be sent over open channels to each subscriber with a publicly-known public-key, which though publicly known, is not capable of decryption by anyone other than the individual subscriber. The utility of a public-key data encryption system for message authentication and transmission of standard keys is more fully described in Hellman, "The Mathematics of Public-Key Cryptography," Scientific American, Vol. 241 (1979), the disclosure of which is hereby incorporated by reference.

These advantages of public-key encryption will enable the expanded use of encryption using, e.g., the NBS standard keys, for message transfers by electronic means in business applications, where security and transmission and receipt authentication are crucial. Presently, however, in order to come "on-line" in such a data encryption system, using RSA public-key encryption for the transfer and receipt of the standard keys, or signatures, a large start-up time or access to a large-scale digital computer is needed. Another alternative of hand delivery of the large randomly generated prime numbers, unique to each subscriber, exists. However, this also requires a possibly compromisable physical transfer by some secure means, which cannot always be guaranteed secure. This also requires the same central location which generates and provides the "secret" public-key decryption key also, at least at some time prior to providing this decryption key to a subscriber, know this key. This is another possible avenue of compromise.

It is, therefore, much more preferable for each subscriber to be able to generate its own large randomly selected prime numbers. Currently, in order to do this, access to a large-scale digital computer is needed, or some twelve to twenty hours of computational time, on a currently commercially available microprocessor, is needed. Even with twelve to twenty hours on the microprocessor, using the exponentiation technique suggested by Rivest, Shamir and Adelman, the numbers generated have only a 50% probability of being prime. The only way to check the primality is to try encrypting and decrypting a message using the generated primes in the RSA scheme. For the recommended probability of $2^{-100}$, 1200 hours of computation time, approximately, are needed on currently commercially available microprocessors.

There thus exists a tremendous need for an RSA public-key data encryption system in which a subscriber, having only a microprocessor of the kind currently commercially available, can come on-line in a relatively short period of time by generating the required prime numbers in a few hours, rather than dozens of hours.

The use of a GCD routine according to the present invention for eliminating composite numbers without exponentiation, along with a unique method of forming a sequence of primes, enables this time to be decreased to about 2 hours, because the number of required exponentiations is dropped from 120 to 20 for each P tested. And only 2 are needed as opposed to standard RSA's 4 (see line 30, page 5). In addition, because the sequence of primes is generated in the form of (hP+1), finding an hP+1 which is prime and of a sufficient length as one of the RSA large random prime numbers p or q, the value of p−1 (or q−1), i.e, hP, will also have a large prime factor, satisfying the RSA requirements. Thus, only hP+1 must be tested for primality, eliminating one of the required tests of primality in the RSA scheme for each of p and q. Therefore, two large random numbers of the form hP+1 must be tested for primality according to the present invention, rather than four numbers according to the suggested procedure in the RSA scheme. The GCD routine eliminates most non-primes. The GCD routine involves the use of a pre-computed composite number equal to the product of the first selected number, e.g., 34 of the known prime numbers, i.e., less than or equal to 139, in a determination of whether the GCD of that composite number and the number being tested is equal to 1. The GCD equaling 1 is a necessary but not sufficient test of the primality of the number being tested. Thus, if the GCD does not equal 1, then the number can be eliminated as a choice of a prime number without the need for the further tests for primality. The further tests for primality according to the present invention are the Euler identities, which constitute a determination of whether both of the following relationships hold true:

$$2^{hP} \equiv 1 (\mod hP+1)$$

$$2^h \not\equiv 1 (\mod hP+1)$$

The reason that most non-primes are found by the GCD routine is that a random sample of odd integers has ⅓ of the integers divisable by 3, 1/5th by 5, etc. Tests by the applicants have shown that about 140 hP+1 random numbers of 23 bytes long must be chosen in accordance with the present invention before a prime number is found. Using a sample of the size of 140, 1/139 or 1 of the sample numbers should be divisible by 139, which is the largest prime not greater than 140. If the sample number is divisible by any of the primes of up to 139, then a composite number which has that prime as a factor will have a GCD with respect to the sample number that is not equal to 1. By using a composite number equal to the product of all of the 34 primes up to 139, the GCD test checks whether the sample is divisible by one of those primes.

The present invention relates, therefore, to a method and apparatus employing a commercially available microprocessor for selecting the large random prime numbers necessary for RSA public-key encryption. More particularly, the present invention relates to a large prime number generating system for use in a public-key encryption system to determine the large random prime numbers by generating a sequence of prime numbers hP+1, where P initially is a randomly selected known prime number of a short length relative to the approximately 23 byte size of the desired randomly selected prime number, and wherein the successive numbers in the sequence have the relationship of hP+1 to the preceding prime number P in the sequence, with h initially being selected to be of a byte length approximately ½ that of the byte length of P, and the values of hP+1 being initially checked by the GCD routine to eliminate the necessity of checking the number hP+1 with the exponentiation modulo (hP+1) tests of primality for a large number of the value of n=hP+1, as h is incremented to h+2 until the value of n is determined to be prime for a given n in the sequence.

The unique method and apparatus employing the GCD elimination along with the generation of a sequence of primes hP+1 until a prime of sufficient length is reached, which prime hP+1 is also in the precise form needed for RSA public-key encryption, and is guaranteed to be a prime, rather than probabilistically selected as prime as with pure exponentiation prime derivation, makes the generation of prime numbers of suitable length on a microprocessor commercially feasible for RSA systems.

The problems enumerated in the foregoing are not intended to be exhaustive, but are rather among many which tend to impair the effectiveness of previously-known methods and apparatus for generating large random prime numbers for use in RSA public-key encryption. Other noteworthy problems may also exist; however, those presented above should be sufficient to demonstrate methods and apparatus for generating random prime numbers for RSA public-key encryption appearing in prior art have not been altogether satisfactory.

Examples of the more important features of the present invention have been summarized broadly in order that the detailed description thereof that follows may be better understood, and in order that the contribution to the art may be better appreciated. There are, of course, features of the invention that will be described hereinafter and which will also form the subject of the appended claims. These other features and advantages of the present invention will become more apparent with reference to the following detailed description of a preferred embodiment thereof in connection with the accompanying drawings, in which:

DETAILED DESCRIPTION

Figure 1:
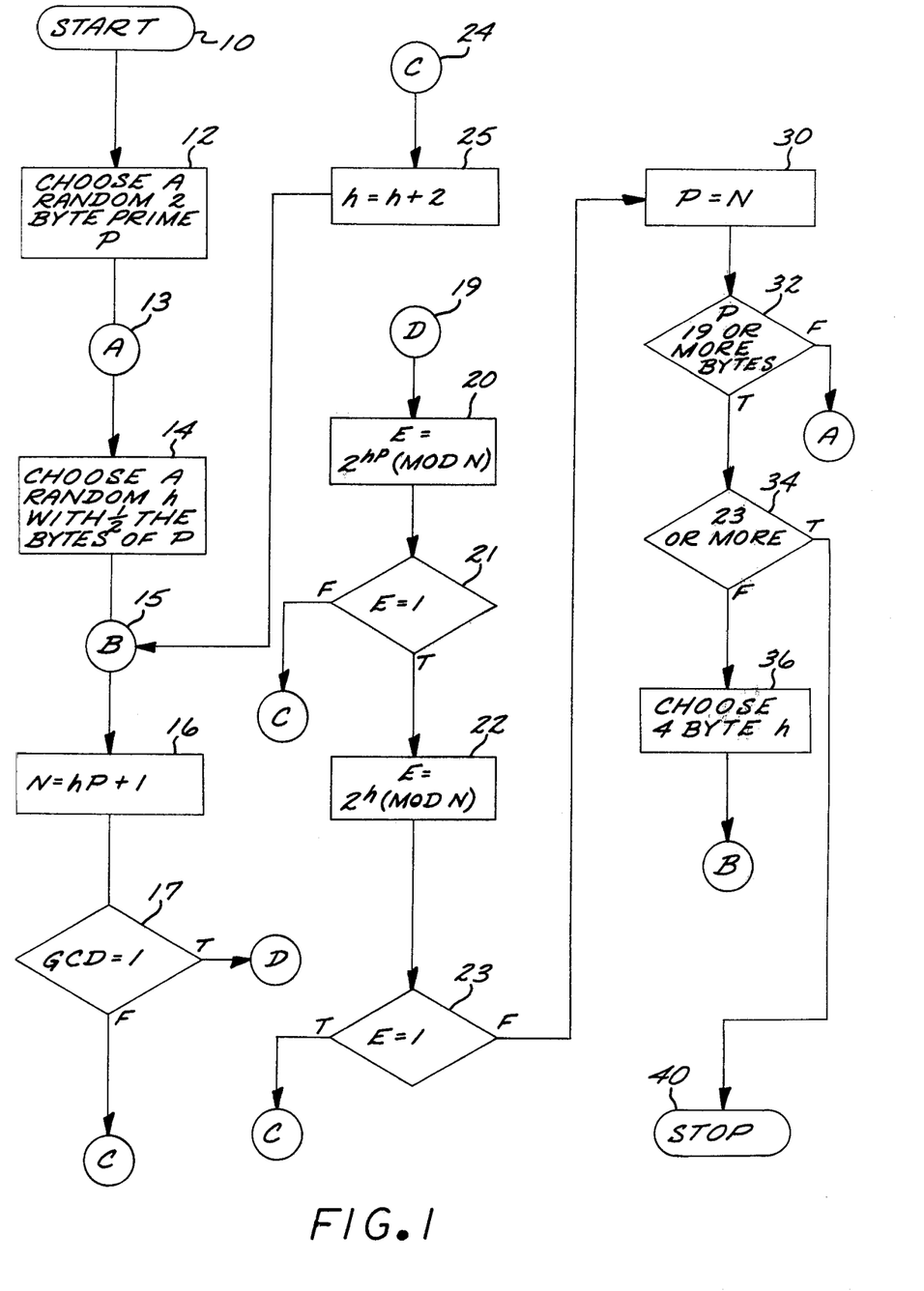
FIG. 1 shows a flow chart of the steps carried out by the microprocessor in order to select the necessary large random prime numbers for use in RSA public-key encryption.

Turning to FIG. 1, a flow chart for a commercially available microprocessor, e.g., an Intel 8085 microprocessor, for the purpose of determining the very large random prime numbers necessary for RSA public-key encryption is shown. It will be understood by those skilled in the art that other large scale integrated circuits or combinations thereof which are not microprocessors, as that term has been come to be understood in the art, could be hard wired together or along with other circuit components to perform the same function as the microprocessor herein described and without the need for a main frame programmed digital computer or mini-computer. For example, a large scale integrated circuit chip has been known to be useful for performing the exponentiation operation in the RSA scheme. This same chip could be used in a circuit to perform the same, or a similar, exponentiation operation as part of the method and apparatus of the present invention. Other well-known circuit components, e.g., registers, shifters, adders and multipliers, can be hard wired together, as is known in the art pursuant to the teaching of the present application, for carrying out the method of the present invention on an apparatus, which, though not commonly referred to as a microprocessor, performs the same function and at the same time is not a main frame programmed digital data computer or minicomputer. These components, including the exponentiator chip, could all be on the same large scale integrated circuit, custom designed to carry out only the method of the present invention, or on a number of separate large-scale integrated circuit chips, each connected electrically to one or more of the others and each custom designed to carry out one or more of the steps of the process of the present invention. This single large-scale integrated circuit chip or group of large scale integrated circuit chips could have a control means hard wired on the chip or be associated with a separate control means, e.g., logic sequencer or finite state machine, hard wired to produce a sequence of control signals which control signals might also be effected by the outcome of intermediate steps in the process. Based upon the disclosure in the present invention, one skilled in the art would be able to set up the control means of a commercially available microprocessor or be able to assemble other large-scale integrated circuit components with associated integral or external control means in the manner of the apparatus of the present invention for the purpose of carrying out the process of the present invention. When used in the attached claims, "large scale integrated circuit" or "large scale integrated circuit means" is intended to cover both commercially available microprocessors and an assemblage of one or more large-scale integrated circuit components, hard wired to perform a specific function or sequence of functions and with an associated integral or external control means, and not to include a software programmed main frame digital computer or mini-computer.

Turning now to the preferred embodiment using a microprocessor means, beginning at start 10 the microprocessor is constructed to choose, in block 12, a prime number P at random from the known prime numbers having a byte length of, e.g., two eight-bit bytes, i.e., of a decimal of length of approximately five. Step A, at 13 in FIG. 1, then indicates that the microprocessor is constructed to choose, in block 14 of FIG. 1, a random h with one half the bytes of P, i.e., initially one byte. Also, h is selected to be an even number and $2 \leq h < P$. In step B, at 15 in FIG. 1, the value N is set to equal $hP + 1$ in block 16 in FIG. 1.

A greatest common divisor (GCD) routine is then performed within the microprocessor in diamond 17, wherein the relationship $GCD\ [(hP+1), (x)] = 1$ is determined to be true or false, where x is a composite number consisting of the product of the first selected number, e.g., thirty-four, of the prime numbers, i.e., 2, 3, 5, 7, 11, ... 139. If GCD equals one as determined in block 17, step D at 19 in FIG. 1 is carried out in the microprocessor, as indicated by block 20, wherein the value E is set a $2^{hP}\ [\text{mod}\ (hP+1)]$, and E is tested in diamond 21 to determine whether E equals one. If E equals one as determined in diamond 21, a new value of E is set in block 22 as $2^h\ [\text{mod}\ (hP+1)]$ and this value is tested in diamond 23 to determine if E equals one. If E does not equal one, it has been determined that $hP+1$ is prime. Thus, each value of N as established in block 16 will be tested for primality in step D, but only if the GCD of N and x equals one as determined in diamond 17. If E equals one in diamond 21 and does not equal one in diamond 23, then N is a prime number. If the GCD for any N being tested is not equal to one, as determined in diamond 17, or if E is not equal to one as determined in diamond 21 or is equal to one as determined in diamond 23, the microprocessor is constructed to execute step C at 24 in FIG. 1, which increments h in block 25 to a new value equal to h+any even number, preferably 2.

A new value of $N = hP + 1$ is then computed in step B in block 16 using the incremented $h = h + 2$ and the GCD determination is made in diamond 17, resulting in the initiation of step D if GCD equals one or the further incrementation of h in step C if GCD does not equal one.

Once an N has been found which is determined to be prime, i.e., the microprocessor has proceeded in the flow chart to diamond 23 and $E \neq 1$, the microprocessor is constructed to proceed from the step in diamond 23 to block 30 where P is set equal to N. P is then sampled in diamond 32 to determine if P is 19 or more bytes in length. If not, the microprocessor returns to step A where a new value of h is randomly selected having a byte length of one-half of that of the P in the sequence of prime numbers which has just been determined, i.e., the current prime number in the sequence of prime numbers being computed.

It can be seen that the sequence of prime numbers generated by the microprocessor makes a relatively rapid progression to the 23 byte length. This is due to the fact that after each P is found in the sequence, by virtue of being determined to be a prime number, the succeeding prime number in sequence is selected using the current P and an h having $\frac{1}{2}$ the byte length of that current P. Thus, for example, the product hP of the first sampled number will be of three bytes in length, i.e., the sum of two bytes for P and one byte for h. For the next prime number in the sequence, the product hP will have a four byte length, i.e., the sum of three bytes for the first P determined in accordance with the above method, i.e., the current P at that time, and one byte for h. The next product hP in the sequence will have a byte length of six (four bytes for the current P and two for h), with the next value of hP being of nine bytes (six bytes for the current P and three for h), the next value of hP being thirteen (nine bytes for the current P and four for h) and the next successive prime number in the sequence will have the value of hP of nineteen bytes (thirteen for the current P and six for h). After this point, selecting the value of h to be $\frac{1}{2}$ the byte length of the current P will result in an increase in the byte length to approximately twenty-seven bytes. However, it is necessary to achieve only a twenty-three byte length for the utilization of the composite number of two random prime numbers generated according to the present invention in an RSA system having a cryptoanalytically secure computation time of approximately 1,000 years. Therefore, the microprocessor is set up to reduce the size of the randomly selected h, i.e., the byte length thereof, when the current P is determined to be of greater than or equal to nineteen bytes, but not of the desired twenty-three or more bytes in length. This is achieved by the operations performed in diamonds 32 and 34, in which the microprocessor is shown to be constructed to proceed from diamond 32 to diamond 34 if the current P in the sequence is determined to be of nineteen or more bytes, and, in diamond 34, if the current P in sequence is determined to be not of twenty-three or more bytes, the microprocessor proceeds to the step in block 36 where h is limited to a, e.g., four byte length for use in step B, rather than the carrying out of step A in block 14, where h is normally chosen to be $\frac{1}{2}$ the byte length of the current P. Having found a P in the sequence of P's produced according to the microprocessor flow chart shown in FIG. 1, which satisfies the requirements of diamond 34, i.e., that P be of twenty-three or more bytes in length, the microprocessor proceeds to the stop command 40 and the existing current P at the time of the stop command is the output as one large random prime number useful for carrying out RSA public-key encryption. This large random prime number is an input into the remainder of the full system discussed below for generating and employing encryption/decryption keys.

Figure 2:
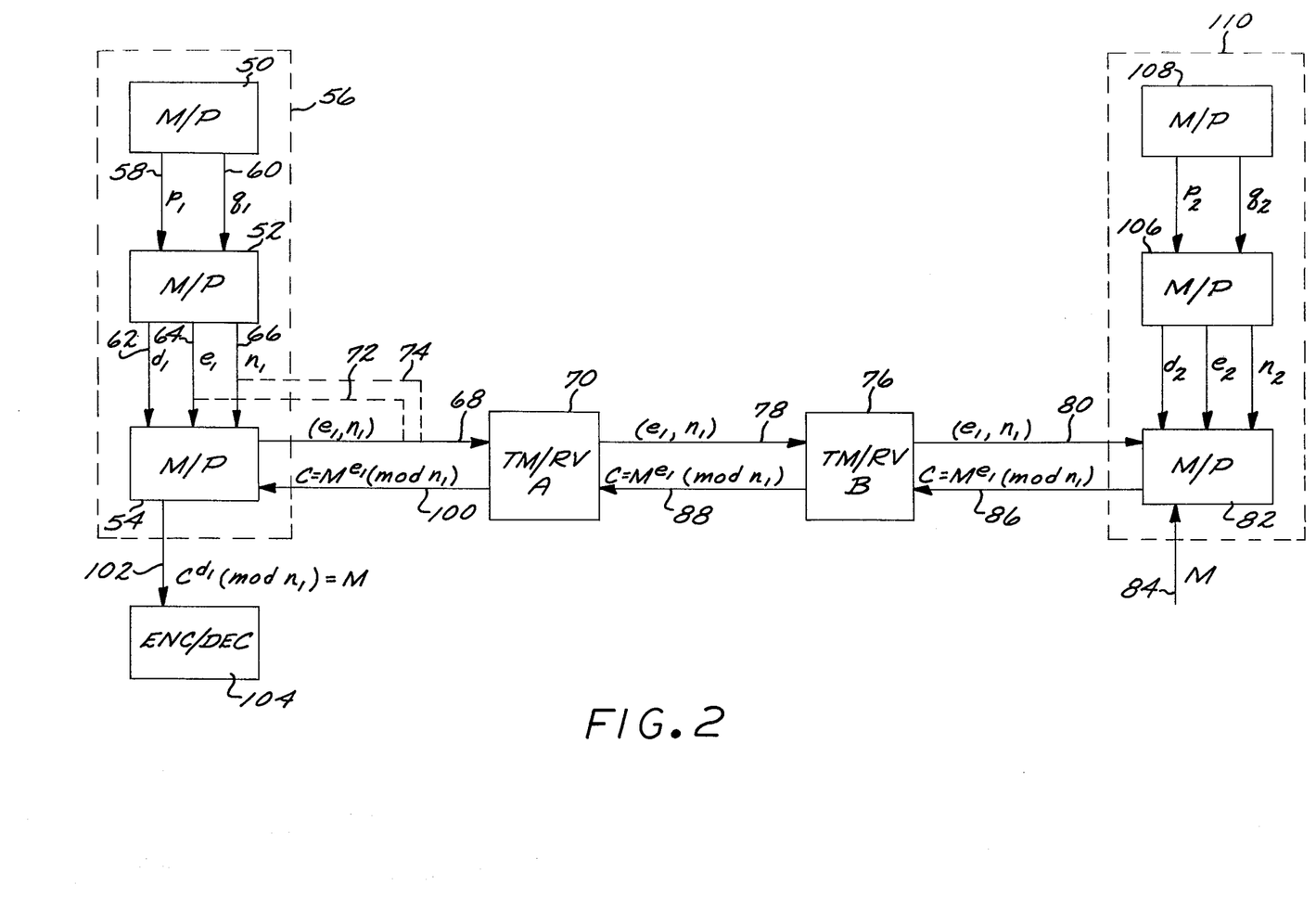
FIG. 2 is a block diagram of the public-key encryption system according to the present invention.

Turning now to FIG. 2, a public-key data encryption system according to the present invention is shown. A first terminal, terminal A, is shown to include a large random prime number generating microprocessor 50, an encryption/decryption key generating microprocessor 52, and an encryption/decryption microprocessor 54. It will be understood that the microprocessors 50, 52 and 54 are shown separately for purposes of discussion and illustration, but could be a single microprocessor formed to perform the various functions, as is indicated by the microprocessors 50, 52 and 54 being included within the dotted lines 56. The large random prime number generating microprocessor 50 is constructed to perform the above-noted steps to generate a large random prime number $p_1$ and to repeat those steps to generate a second large random prime number $q_1$, which are shown schematically to be inputs on lines 58 and 60, respectively, to the encryption/decryption key generating microprocessor 52. The encryption/decryption key generating microprocessor 52 computes the value of $n_1$ as the product of $p_1$ and $q_1$, the value of $e_1$ as having a greatest common divisor (GCD) with $(p_1-1)(q_1-1)=1$; and the value of $d_1$ as the multiplicative inverse in modulo $(p_1-1)(q-1)$ of $e_1$, i.e., $d_1 \cdot e_1 \equiv 1$ [mod $(p-1)(q-1)$]. The values of $d_1$, $e_1$ and $n_1$, are shown schematically to be the inputs to the encryption/decryption microprocessor 54 on lines 62, 64 and 66, respectively.

The encryption/decryption microprocessor 54 provides the values of $e_1$ and $n_1$ on line 68 to a transmitter-receiver 74 for terminal A. It will be understood that the values of $e_1$ and $n_1$ could be supplied directly from the encryption/decryption key generating microprocessor 52, as shown by the dotted lines 72 and 74, respectively. The values of $e_1$ and $n_1$ are transmitted from the transmitter-receiver 70 at terminal A to a transmitter-receiver 76 at terminal B as shown schematically on line 78.

The transmitter-receiver 76 at terminal B provides the values of $e_1$ and $n_1$ on line 80 to an encryption/decryption microprocessor 82 at terminal B. A message M is input into the encryption/decryption microprocessor 82 at terminal B, which generates the encrypted message C equal to $m^{e_1}$ (mod $n_1$) and provides the encrypted message to the transmitter-receiver 76 at terminal B on line 86. The encrypted message C is transmitted from terminal B through the transmitter-receiver 76 to terminal A as indicated by line 88 where it is received on the transmitter-receiver 70 of terminal A, and relayed to the encryption/decryption microprocessor 54 at terminal B. The encryption/decryption microprocessor 54 performs a decryption operation on the encrypted message C of $C^{d_1}$ (mod $n_1$) = M, i.e., $(M^{e_1}$ (mod $n_1))^{d_1}$ (mod $n_1$) = M. In the case where the message M is the standard encryption-decryption keys, e.g., the NBS standard keys, these are input on line 102 to an encryptor/decryptor 104, which may be any suitable encryptor/decryptor, e.g., that shown in the co-pending application of Miller, one of the present applicants, and assigned to the assignee of the present applicants, Ser. No. 108,039, filed on Dec. 28, 1979. It will also be understood that the message M could be an authenticating signature, specific to terminal B, when the system is used for message receipt and transmission authentication.

Terminal B is also shown to have a large random prime number generating microprocessor 108 and an encryption/decryption key generating microprocessor 106. As with the corresponding elements at Terminal A, these microprocessors 106, 108, along with encryption/decryption microprocessor 82, may be a single microprocessor formed to perform the various functions, as is indicated by the inclusion of the microprocessors 106, 108 and 82, within the dotted lines 110. The large random prime number generating microprocessor 108 generates two large prime numbers $p_2$ and $q_2$ which are input into the encryption/decryption key generating microprocessor 106 which generates the values $d_2$, $e_2$ and $n_2$, specific to terminal B, and inputs them into the encryption/decryption microprocessor 82. These values of $d_2$, $e_2$ and $n_2$ can then be used by Terminal B in the same manner as the values of $b_1$, $e_1$ and $n_1$ are described above with respect to Terminal A.

It will further be understood that the necessity to transmit the values of $e_1$ and $n_1$ for Terminal A or $e_2$ and $n_2$ for Terminal B may be eliminated by having a publicly-known list of values of e and n for each subscribing data terminal. Since these can be publicly-known, there is no need to securely transmit or securely ship the list of e and n values for the various subscribers on the data transmission line.

SUMMARY OF THE SCOPE AND ADVANTAGES OF THE PRESENT INVENTION

It will be appreciated that in constructing a public-key data encryption system according to the present invention, certain significant advantages are provided.

In particular, for the first time, subscribers on an encrypted data line who do not have access to a large-scale digital computer, can come on line with values of e and n specific to that subscriber, securely generated in-house by the subscriber, in a relatively short period of time using a microprocessor to generate the large random prime numbers p and q. In the past, microprocessors were unable to generate the required large random prime numbers, having both the desired cryptoanalytically secure length and the recommended probability of being prime, in less than approximately 1200 hours. Thus, a new subscriber's data encryption system, including the large random prime number generating microprocessor according to the present invention can be installed and an encrypted test message developed to check the proper operation of the system and the primality of the generated large random prime numbers, in only a few hours. The necessity for access to a large-scale digital computer or for the secure transmission from a central location of values of d, e and n for a new subscriber, which transmission is always subject in some degree to possible compromise, are thereby eliminated by the present invention. The present invention vastly expands the access to public-key data encryption systems for subscribers who need to use microprocessor because of the inability to access securely a large-scale digital computer. In addition, the system according to the present invention enables a user, with the application only of currently available microprocessors or other large-scale integrated circuit means, to periodically change the values of d, e and n, which can then be used in the system. The values of e and n are then either directly transmitted on public transmission lines to another terminal for the purpose of initiating the transmission by that terminal of an encrypted message using the values of e and n so transmitted, or are then included in an updated version of the publicly-known list of values of e and n for the various subscribers on the date line. Further, the microprocessor constructed according to the present invention will generate large random prime numbers p and q, which are guaranteed to be both prime and of a desired cryptoanalytically secure length. Still further, only two numbers of the desired length must be checked for primality rather than the typical four numbers for RSA public-key data encryption.

The foregoing description of the invention has been directed to a particular preferred embodiment in accordance with the requirements of the patent statutes and for purposes of explanation and illustration. It will be apparent, however, to those of ordinary skill in this art, that many modifications and changes in both the apparatus and method of the present invention may be made without departing from the scope and spirit of the invention. For example, the exponential tests of primality may be performed in the order set forth in the flow chart of the microprocessor or may be done in reverse order, so long as a determination is made that $2^{hP}$ [mod (hp+1)] is equal to one, and $2^h$ [mod (hP+1)] is not equal to one. In addition, the 23 byte length for the finally-selected key is chosen to give a cryptoanalytically secure computational time of approximately 1,000 years, but may be varied as desired for longer or shorter cryptoanalytically secure computational times. In addition, the step of reducing the byte length of the randomly chosen h, after P reaches a certain byte length, less than the desired cryptoanalytically secure byte length for P, is used for optimizing the reduction in total computation time necessary to achieve a P having the desired cryptoanalytically secure byte length, as illustrated in FIG. 1. However, this step may be eliminated by, e.g., in the example shown in FIG. 1, in which h is initially chosen to be one-half the byte length of the previously determined P, the ultimate byte length for P could be desirably set at 27. In this event, upon reaching a 19 byte length for P, the next successive h would be selected at a byte length of 9, thus achieving the byte length desired, i.e., 27. Further, the selection of h at one-half the byte length of the current prime number P in the sequence of prime numbers is a convenient way to relatively rapidly increase the total byte length of hP+1, in order to achieve the desired cryptoanalytically secure byte length of 23, e.g., as is shown in FIG. 1. It will be understood that h could be selected to be of, e.g., an equal byte length (providing h<P) or a one-third byte length of the current P in the sequence of prime numbers, or of any other desired fraction of P, so long as h<P. The initial P in the sequence of prime numbers is shown in the example of FIG. 1 to be randomly selected. This adds additional randomness to the ultimately determined P having the desired cryptoanalytically secure length. However, it is not necessary that the initial P be a randomly selected one, since h is also chosen at random for each generation of a prime number in the sequence of prime numbers.

What is claimed is:

1. In a public-key data encryption/decryption system having a plurality of terminals, a terminal comprising:
a transmitter-receiver capable of receiving an encrypted message encrypted using a non-secret encryption key specific to the terminal;
an encrypter/decrypter, coupled to the transmitter-receiver, adapted to decrypt the encrypted message using a secret decryption key;
an encryption/decryption key generator coupled to the encrypter/decrypter and adapted to generate the non-secret and secret keys by use of a pair of large randomly selected prime numbers;
a large random prime number generator, including a large-scale integrated circuit, coupled to the key generator and adapted to provide the key-generator with the pair of random large prime numbers having a desired length, the large-scale integrated circuit being constructed to perform the following operations in selecting each of the pair of large random prime numbers:
starting with a P, which is a known prime number having a length which is relatively short in comparison to the desired length, forming a sequence of prime numbers in the form hP+1, wherein P is the current prime number in the sequence of prime numbers, by selecting at random an h and forming hP+1 and testing hP+1 for primality by determining first if the greatest common divisor (GCD) of (hP+1), (x) is one, wherein x is a composite number consisting of the product of all known prime numbers less than or equal to a selected known prime number, and if the GCD is equal or one, determining if both $2^{hP} \equiv 1$ [mod (hp+1)] and $2^h \not\equiv 1$ [mod (hP+1)], and, if GCD is not equal to one, incrementing h to form a new hP+1, and if GCD is equal to one, but either $2^{hP} \not\equiv 1$ [mod (hP+1)] or $2^h \equiv 1$ [mod (hP+1)], incrementing h to form a new hP+1, but if both $2^{hP}|$[mod (hP+1)] and $2^h \not\equiv 1$ [mod (hP+1)], determining if the length of hP+1 is greater than or equal to the desired length, and if greater than or equal to the desired length then setting hP+1 as an output as a large random prime number to the encryption/decryption key generator, and if not greater than or equal to the desired length, then placing hP+1 in the sequence of prime numbers and repeating the above steps using hP+1 as the new P and commencing by selecting a new h as above set forth.

2. The public-key data encryption system of claim 1 wherein the large-scale integrated circuit is constructed to select the initial h, for the formation of each succeeding prime number in the sequence of prime numbers, to have a length of about one-half that of the current prime number in the sequence of prime numbers.

3. The public-key data encryption system of claim 1 wherein the large-scale integrated circuit is constructed to further determine if the length of hP+1 is within a pre-selected length of the desired length, if not greater than or equal to the desired length, and if within the pre-selected length and not greater than or equal to the desired length, to select the next initial h with a selected length less than about one-half of the length of the current prime number in the sequence of prime numbers, but of a length sufficient to make the next prime number in the sequence of prime numbers greater than or equal to the desired length.

4. The public-key data encryption system of claim 3 wherein the desired length is 23 bytes each of eight bits.

5. The public-key data encryption system of claim 4 wherein the pre-selected length is 4 bytes each of eight bits.

6. The public-key data encryption system of claim 5 wherein the selected length is 4 bytes.

7. The public-key data encryption system of claim 1 wherein:

the non-secret key is (e, n) such that the encrypted form of a message M is $M^e$ (mod n);

the secret key is d, such that the decrypted form of the encrypted form of the message M is $(M^e \text{ (mod n)})^d$ (mod n);

n is the product of two large random prime numbers p and q, each having a desired length, such that n has a suitable cryptoanalytically secure length to make n cryptoanalytically secure for a desired cryptoanalytic computational time;

e is an integer selected to have a GCD of [(e), (p−1) (q−1)]equal to 1; and $e*d \equiv 1$ [mod (p−1) (q−1)].

8. The public-key data encryption system of claim 7 wherein the desired cryptoanalytic computational is approximately 1,000 years.

9. The public-key data encryption system of claim 8 wherein p and q are at least 23 bytes in length and n is at least 46 bytes in length.

10. In a public-key data encryption system having a plurality of terminals, a terminal comprising:

a transmitter-receiver means for receiving encrypted messages, encrypted using a non-secret encryption key specific to the terminal;

an encrypter/decrypter means, for decrypting the encrypted message using a secret decryption key;

an encryption/decryption key generating means, coupled to the encrypter/decrypter means, for generating the non-secret and secret keys by use of a pair of large randomly selected prime numbers;

a large random prime number generating means, including a large-scale integrated circuit means, coupled to the encryption/decryption key generating means, for generating separately each of the pair of large randomly selected prime numbers, each having a desired length, the large-scale integrated circuit means including:

a random prime number selecting means for selecting a prime number P from the known prime numbers having a length relatively short in comparison to the desired length;

a prime number sequence generating means for generating a sequence of prime numbers starting with the prime number P selected by the prime number selecting means, the prime number sequence generating means including:

a selecting means for selecting a random h and forming the quantity hP+1, wherein P is the current prime in the computed sequence of prime numbers and is initially the P selected by the prime number selecting means;

a greatest common divisor (GCD) testing means for testing whether the GCD of (x), (hP+1) is equal to 1, wherein x is a composite number formed from the product of known prime numbers less than or equal to a selected known prime number;

a primality testing means, responsive to the determination by the GCD testing means that the GCD is equal to 1, for determining if both $2^{hP} \equiv 1$ [mod (hP+1)] and $2^h \equiv 1$ [mod (hP+1)];

an incrementing means, responsive to either the determination by the GCD testing means that the GCD is not equal to 1 or the determination by the primality testing means that either $2^{hP} \not\equiv 1$ [mod (hP+1)] or $2^h \equiv 1$ [mod (hP+1)], for incrementing h and forming a new hP+1 and initiating the determination by the GCD testing means with respect to the new hP+1;

a length determining means, responsive to the determination by the primality testing means that both $2^{hP} \equiv 1$ [mod (hP+1)] and $2^h \not\equiv 1$ [mod (hP+1)], for determining whether the length of hP+1 is greater than or equal to the desired length; and, a sequence placement means, responsive to the determination by the length determining means, that the length of hP+1 is not greater than or equal to the desired length, for placing hP+1 in the sequence of prime numbers and for initiating the selection by the selecting means of a new h to form a new hP+1, wherein P is the hP+1 previously determined to be prime but not greater than or equal to the desired length; and, an output means, coupled to the prime number sequence generating means and responsive to the determination by the length determining means that a respective hP+1 is greater than or equal to the desired length, for selecting the respective hP+1 as the output to the encryption/decryption key generating means as one of the necessary large randomly selected prime numbers having the desired length.

11. The public-key data encryption system of claim 10 wherein:

the selecting means includes a means for selecting each initial h which is even and which has a length of about one-half of the length of the current prime number in the sequence of prime numbers.

12. The public-key data encryption system of claim 10 wherein:

the length determining means includes a means for determining if the respective hP+1 is within a pre-selected length of the desired length, if not greater than or equal to the desired length, and if within the pre-selected length but not greater than or equal to the desired length, for initiating the selection by the selecting means of new initial h having a length less than approximately one-half of the length of the current prime number in the sequence of prime numbers, but sufficient to make the next prime number in the sequence of prime numbers greater than or equal to the desired length.

13. The public-key data encryption system of claim 12 wherein the desired length is 23 bytes.

14. The public-key data encryption system of claim 13 wherein the pre-selected length is 4 bytes.

15. The public-key data encryption system of claim 14 wherein the selected length is 4 bytes.

16. The public-key data encryption system of claim 10 wherein:

the non-secret encryption key is (e, n) such that the encrypted form of a message M is $M^e$ (mod n);

the secret decryption key is d, such that the decrypted form of the encrypted form of the message M is $(M^e \text{ (mod n)})^d$ (mod n);

n is the product of two large randomly selected prime numbers p and q, each having a desired length, such that n has a suitable cryptanalytically secure length to make n cryptanalytically secure for a desired cryptanalytic computational time; e is an integer selected to have a GCD of [(e), (p−1) (q−1)] equal to 1; and $e*d \equiv 1 \; [\text{mod} \; (p-1)(q-1)]$.

17. The public-key data encryption system of claim 16 wherein the desired cryptanalytic computational time is approximately 1,000 years.

18. The public-key data encryption system of claim 17 wherein p and q are at least 23 bytes in length and n is at least 46 bytes in length.

19. The public-key data encryption system of claims 1, 2, 3, 4, 5, 6, 7, 8, 9, 10, 11, 12, 13, 14, 15, 16, 17 or 18 wherein P is initially randomly selected from the known prime numbers having a length relatively short in comparison to the desired length.

20. The public-key data encryption system of claims 1, 2, 3, 4, 5, 6, 7, 8, 9, 10, 11, 12, 13, 14, 15, 16, 17 or 18 wherein the selected known prime number is 139.

21. In a public-key data encryption system employing RSA public-key data encryption, a large random prime number generating means for generating large randomly selected prime numbers necessary for RSA public-key data encryption, each having a desired length, the random prime number generating means including a large-scale integrated circuit means for performing the following operations in selecting each of the necessary large random prime numbers:

starting with a P, which is a known prime number having a length which is relatively short in comparison to the desired length, forming a sequence of prime numbers in the form hP+1, wherein P is the current prime number in the computed sequence of prime numbers, by selecting at random an h and forming hP+1 and testing hP+1 for primality by determining first if the greatest common divisor (GCD) of [(hP+1), (x)] is one, wherein x is a composite number consisting of the product of known prime numbers less than or equal to a selected known prime, and if the GCD is equal to 1, determining if both $2^{hP} \equiv 1$ [mod (hP+1)] and $2^h \not\equiv 1$ [mod (hP+1)], and if the GCD is not equal to 1, or if the GCD is equal to 1, but either $2^{hP} \not\equiv 1$ [mod (hP+1)] or $2^h \equiv 1$ [mod (hP+1)], incrementing h to form a new hP+1, but if both $2^{hP} \equiv 1$ [mod (hP+1)] and $2^h \not\equiv 1$ [mod (hP+1)], determining if hP+1 is greater than or equal to the desired length, and if greater than or equal to the desired length, then setting hP+1 as one of the necessary large randomly selected prime numbers, and if not greater than or equal to the desired length, then placing hP+1 in the sequence of prime numbers and repeating the above steps using hP+1 as the new P and commencing by selecting a new h as above set forth.

22. In a public-key data encryption system employing RSA public-key data encryption, a large random prime number generating means for generating large randomly selected prime numbers necessary for RSA public-key data encryption, each having a desired length, the random prime number generating means including a large-scale integrated circuit means for generating the random prime numbers, the large-scale integrated circuit means having:

a random prime number selecting means for selecting a prime number P from the known prime numbers having a length relatively short in comparison to the desired length;

a prime number sequence generating means for generating a sequence of prime numbers starting with the prime number P selected by the prime number selecting means, the prime number sequence generating means including:

a selecting means for selecting a random h and forming the quantity hP+1, wherein P is the current prime number in the sequence of prime numbers and is initially the P selected by the prime number selecting means;

a greatest common divisor (GCD) testing means for testing whether the GCD [(x), (hP+1)] is equal to 1, wherein x is a composite number formed from the product of all known prime numbers less than or equal to a selected known prime number;

a primality testing means, responsive to the determination by the GCD testing means that the GCD is equal to 1, for determining if both $2^{hP} \equiv 1$ [mod (hP+1) and $2^h \not\equiv 1$ [mod (hP+1)];

an incrementing means, responsive to either the determination by the GCD testing means that the GCD is not equal to 1, or the determination by the primality testing means that either $2^{hP} \not\equiv 1$ [mod (hP+1)] or $2^h \equiv 1$ [mod (hP+1)], for incrementing h and forming a new hP+1, and initiating the determination by the GCD testing means with respect to the new hP+1;

a length determining means, responsive to the determination by the primality testing means that both $2^{hP} \equiv 1$ [mod (hP+1)] and $2^h \not\equiv 1$ [mod (hP+1)], for determining whether the length of hP+1 is greater than or equal to the desired length;

sequence placement means, responsive to the determination by the length determining means, that the length of hP+1 is not greater than or equal to the desired length, for placing hP+1 in the sequence of prime numbers and for initiating the selection by the selecting means of a new h to form a new hP+1 wherein P is the hP+1 previously determined to be prime but not greater than or equal to the desired length; and, an output means, responsive to the determination by the length determining means that a respective hP+1 is greater than or equal to the desired length, for selecting the respective hP+1 as one of the large randomly selected prime numbers necessary for the RSA public-key data encryption.

* * * * *

UNITED STATES PATENT AND TRADEMARK OFFICE
CERTIFICATE OF CORRECTION

PATENT NO. : 4,351,982

DATED : September 28, 1982

INVENTOR(S) : William J. Miller, Nick G. Trbovich

It is certified that error appears in the above—identified patent and that said Letters Patent is hereby corrected as shown below:

Column 2, line 43, after "is well" insert --known--.

Column 12, line 37, delete "equal or one" and insert --equal to one--.

Signed and Sealed this

Twenty-first Day of December 1982

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 4,351,982
DATED : September 28, 1982
INVENTOR(S) : William J. Miller and Nick G. Trbovich It is certified that error appears in the above—identified patent and that said Letters Patent is hereby corrected as shown below:

Column 14, line 4, delete "$\equiv$" and insert --$\neq$--.

Signed and Sealed this

Ninth Day of August 1983

[SEAL]

Attest:

GERALD J. MOSSINGHOFF

*Attesting Officer*     *Commissioner of Patents and Trademarks*